United States Patent [19]

Konishi et al.

[11] Patent Number: 5,461,429
[45] Date of Patent: Oct. 24, 1995

[54] WHITE BALANCE AND IMAGE COLOR CONTROL DEVICE

[75] Inventors: Shinichi Konishi, Hirakata; Haruo Yamashita, Ibaraki; Tsumoru Fukushima, Katano, all of Japan

[73] Assignee: Matsushita Electric Industrial Co., Ltd., Osaka, Japan

[21] Appl. No.: 114,644

[22] Filed: Aug. 31, 1993

[30] Foreign Application Priority Data

Sep. 2, 1992 [JP] Japan .................................. 4-234765

[51] Int. Cl.$^6$ .................................................. H04N 9/73
[52] U.S. Cl. ........................................ 348/ 656; 348/223
[58] Field of Search ....................................... 358/29, 29 C, 358/41; 348/223, 655, 656, 227, 225, 228; H04N 9/73

[56] References Cited

U.S. PATENT DOCUMENTS

| | | | |
|---|---|---|---|
| 4,739,393 | 11/1986 | Seki et al. | 348/225 |
| 4,963,978 | 10/1990 | Ueda et al. | 358/29 |
| 4,992,855 | 2/1991 | Takei | 258/29 C |
| 5,068,718 | 11/1991 | Iwabe et al. | 348/675 |
| 5,144,420 | 9/1992 | Omuro | 358/29 |
| 5,164,820 | 11/1992 | Jeon et al. | 348/655 |
| 5,198,890 | 3/1993 | Suga et al. | 348/227 |
| 5,253,047 | 10/1993 | Machishima | 358/29 |
| 5,329,362 | 7/1994 | Takaiwa | 348/223 |

FOREIGN PATENT DOCUMENTS

| | | | |
|---|---|---|---|
| 0356123 | 8/1989 | European Pat. Off. | H04N 9/73 |
| 63-177681 | 7/1988 | Japan | H04N 9/73 |
| 1186092 | 7/1989 | Japan | H04N 9/73 |

OTHER PUBLICATIONS

"Color Scheme of Computer Graphics Screen", A Second Color Technology Conference, Nov. 19–20, 1985 (with partial translation).

"Transmission and Reception", Color Television, pp. 24–27, by D. G. Fink, U.S. Copywright 1956, by Philco Corporation, Philadelphia, Pa.

Primary Examiner—James J. Groody
Assistant Examiner—Glenton B. Burgess
Attorney, Agent, or Firm—Price, Gess & Ubell

[57] ABSTRACT

A white balance coefficient setting unit 51 sets a white balance coefficient for an image signal; a white balance correction coefficient determination unit 52 determines two white balance correction coefficients to be applied to a luminance signal of the image signal in accordance with the white balance coefficient; a luminance signal operation unit 59 obtains two output signals by multiplying the luminance signal by each of the two white balance correction coefficients; a first adder 57 adds one of the two output signals and a first color difference signal of the image signal together; a second adder 58 adds the other output signal and a second color difference signal of the image signal together. Adding results of the first and the second adders 58 and 59 will be output as a white balance correction value to be applied to the two color difference signals.

11 Claims, 6 Drawing Sheets

WHITE BALANCE AND IMAGE COLOR CONTROL DEVICE

BACKGROUND OF THE INVENTION (1) Field of the Invention

The present invention relates to an image signal processing device for correcting white balance by using a luminance signal and color-difference signals.

(2) Description of the Invention

Conventionally, the broadcast-use triniscope employing three separate cathode ray tubes for the red, green and blue images can keep a white balance of the image by covering itself with a color filter appropriate for a color temperature at the light source. When covering of the light source with the color filter does not correct the white balance of the image satisfactory, further white balance correction is provided by manipulating the RGB signal components with respective white balance coefficients. More specifically, the sum of the RGB signal components manipulated by respective white balance coefficients will be 1 if a white paper is shot. Thus, a slip in the white balance of the color image is found in its RGB signal components, and can be canceled by manipulating them with appropriate white balance coefficients. Such white balance correction is proved to be highly accurate.

This white balance correction method; however, can be applied to only the image signal processing device processing the RGB signals. On the other hand, the visual display unit having an image sensor, such as a CCD (Charge Coupled Device), generally processes the luminance signal and the color difference signals instead of the RGB signals, so that the above effective white balance correction cannot be applied thereto directly. Conventionally, the luminance and the color difference signals are converted into the RGB signals before the white balance correction is applied thereto. Formula 1 shows the white balance correction applied to the luminance and the color difference signals. In the formula, Y is the luminance signal; R-Y and B-Y are the color difference signals; and $Kr$, $Kg$, $Kb$ are amplitude values of R signal, G signal, B signal respectively.

$$\begin{bmatrix} Y \\ (R-Y)' \\ (B-Y)' \end{bmatrix} = \begin{bmatrix} 0.3Kr & 0.59Kg & 0.11Kb \\ 0.7Kr & -0.59Kg & -0.11Kb \\ -0.3Kr & -0.59Kg & 0.89Kb \end{bmatrix} \begin{bmatrix} 1 & 1 & 0 \\ 1 & -0.585 & -0.1864 \\ 1 & 0 & 1 \end{bmatrix} \begin{bmatrix} Y \\ R-Y \\ B-Y \end{bmatrix} \quad \text{[Formula 1]}$$

A matrix locating in center of the right side converts the luminance and the color difference signals into the RGB signals; and a matrix locating at left end of the right side shows white balance coefficients to be applied to the RGB signal. As shown in Formula 2, $Kr$, $Kg$, $Kb$ are related to each other so that the luminance level of the input color image signal will not change after the white balance correction, and Formula 3 will be obtained by substituting Formula 2 into Formula 1.

The above white balance correction has the drawback that the circuit implementing this is very complicated and expensive; therefore, it is not suitable for a handy and simple image processing device such as a video use camera.

Conventionally, a video use camera corrects the white balance with a color control circuit which does not employ the white balance correction in Formula 3. FIG. 1 is a circuit block diagram showing the major part of the image signal processing device having such color control circuit. This image signal processing device comprises a color CCD image sensor 91, a color control circuit 92, a gamma correction circuit 93, and an encoder 94. The CCD image sensor 91 outputs the luminance signal Y and the color difference signals R-Y, B-Y responding to an input color image; the color control circuit 92 receives from the color CCD image sensor 91 the luminance signal Y, the color difference signals R-Y, B-Y, and applies white balance correction to these signals; the gamma correction circuit 93 applies gamma correction to the output of the color control circuit 92; and the encoder 94 converts the output of the gamma correction circuit 92 into NTSC (National Television Standard Committee) signal.

In this construction, the image signal processing device has the color control circuit 92 correct the white balance of the input image with reference to Formula 4. In the formula, Kr and Kb indicate white balance coefficients.

$$\begin{bmatrix} (R-Y)' \\ (B-Y)' \end{bmatrix} = \begin{bmatrix} Kr + (R-Y) \\ Kb + (B-Y) \end{bmatrix} \quad \text{[Formula 4]}$$

According to the white balance correction in the formula, the color difference coordinates (R-Y, B-Y) of the input color image signal are transferred in parallel. In this correction, white color locating at origin can be corrected into the wanted color; however, other colors cannot be corrected into the wanted colors. That is, the further the coordinates of the input image signal are distant from the origin, in other words the image signal with higher level of color saturation, the less effective the white balance correction becomes. Results of such correction are shown in Table 1-1. In the table, ideal luminance signal and color difference signals are compared to the luminance and color difference signals obtained in Formula 4; and error is avoided by determining the white balance coefficients Kr and Kb to be −0.03 and 0.07 respectively for input of R=G=B=0.5. As apparent from the table, the corrected luminance and the corrected color difference $$0.59Kg = 1 - 0.3Kr - 0.11Kb \quad \text{[Formula 2]}$$

$$\begin{bmatrix} Y \\ (R-Y)' \\ (B-Y)' \end{bmatrix} = \begin{bmatrix} 1 & 0.3Kr - 0.3Kg & -0.11Kg + 0.11Kb \\ Kr - 1 & 0.7Kr - 0.3Kg & 0.11Kg - 0.11Kb \\ Kb - 1 & -0.3Kr + 0.3Kg & 0.11Kg + 0.89Kb \end{bmatrix} \begin{bmatrix} Y \\ R-Y \\ B-Y \end{bmatrix} \quad \text{[Formula 3]}$$

signals do not agree with the ideal signals; especially B-Y signal for the input signals R=0, G=0.2, B=0 differs from the ideal signal by as high as 50%. Such difference in the signals will result in the corrected color image significantly different from the wanted color image.

Also the luminance signals and the color-difference signals in Table 1-1 are converted into the RGB signals to be expressed in 256 gradation. Table 1-2 shows the correction results expressed in 256 gradation. As shown in the table, it is apparent that the corrected RGB signals are significantly different from the ideal RGB signals. That is, the finding in Table 1-1 is confirmed in Table 1-2.

SUMMARY OF THE INVENTION

Accordingly, it is an object of the present invention to provide an image processing device which can implement white balance correction of luminance and color difference signals with a simple and a compact circuit.

It is another object of the present invention to provide an image processing device capable of white balance correction without deviating the input color image of high saturation level whose coordinates are distant from the origin of white color.

It is a further object of the present invention to simplify the conventional image processing device for the white balance correction which realizes Formula 3, and to implement a white balance correction equivalent to the conventional one with such simplified image processing device.

TABLE 1-2

Comparison of invented white balance correction to conventional white balance correction in 256 gradation
(R:G:B = 0.95:1:1.14 lighting source: incandescent lamp)

| input signals | | | ideal RGB signals | | | obtained RGB signals | | |
|---|---|---|---|---|---|---|---|---|
| R | G | B | R | G | B | R | G | B |
| 0 | 0 | 0 | 0 | 0 | 0 | 0 | 1 | 18 |
| 51 | 0 | 0 | 48 | 0 | 0 | 43 | 1 | 18 |
| 0 | 51 | 0 | 0 | 51 | 0 | 0 | 52 | 18 |
| 0 | 0 | 51 | 0 | 0 | 58 | 0 | 1 | 69 |
| 51 | 51 | 51 | 48 | 51 | 58 | 43 | 52 | 69 |
| 102 | 0 | 0 | 97 | 0 | 0 | 94 | 1 | 18 |
| 0 | 102 | 0 | 0 | 102 | 0 | 0 | 103 | 18 |
| 0 | 0 | 102 | 0 | 0 | 116 | 0 | 1 | 120 |
| 102 | 102 | 102 | 97 | 102 | 116 | 94 | 103 | 120 |
| 128 | 128 | 128 | 121 | 128 | 145 | 120 | 128 | 145 |
| 153 | 0 | 0 | 145 | 0 | 0 | 145 | 1 | 18 |
| 0 | 153 | 0 | 0 | 153 | 0 | 0 | 154 | 18 |
| 0 | 0 | 153 | 0 | 0 | 174 | 0 | 1 | 171 |
| 153 | 153 | 153 | 145 | 153 | 174 | 145 | 154 | 171 |
| 204 | 0 | 0 | 194 | 0 | 0 | 196 | 1 | 18 |
| 0 | 204 | 0 | 0 | 204 | 0 | 0 | 205 | 18 |
| 0 | 0 | 204 | 0 | 0 | 233 | 0 | 0 | 222 |
| 204 | 204 | 204 | 194 | 204 | 233 | 196 | 205 | 222 |
| 255 | 0 | 0 | 242 | 0 | 0 | 247 | 1 | 18 |
| 0 | 255 | 0 | 0 | 255 | 0 | 0 | 255 | 18 |
| 0 | 0 | 255 | 0 | 0 | 255 | 0 | 1 | 255 |
| 255 | 255 | 255 | 242 | 255 | 255 | 247 | 255 | 255 |

TABLE 1-1

Comparison of invented white balance correction to conventional white balance correction
(R:G:B = 0.95:1:1.14 lighting source: incandescent lamp)

| | input signals | | | ideal signals | | | obtained signals | | |
|---|---|---|---|---|---|---|---|---|---|
| | R | G | B | Y | R-Y | B-Y | Y | R-Y | B-Y |
| Black | 0 | 0 | 0 | 0.00 | 0.00 | 0.00 | 0.00 | −0.03 | 0.07 |
| | 0.2 | 0 | 0 | 0.06 | 0.13 | −0.06 | 0.06 | 0.11 | 0.01 |
| | 0 | 0.2 | 0 | 0.12 | −0.12 | −0.12 | 0.12 | −0.15 | −0.05 |
| | 0 | 0 | 0.2 | 0.03 | −0.03 | 0.20 | 0.02 | −0.05 | 0.25 |
| | 0.2 | 0.2 | 0.2 | 0.2 | −0.01 | 0.03 | 0.20 | −0.03 | 0.07 |
| | 0.4 | 0 | 0 | 0.11 | 0.27 | −0.11 | 0.12 | 0.25 | −0.05 |
| | 0 | 0.4 | 0 | 0.24 | −0.24 | −0.24 | 0.24 | −0.27 | −0.17 |
| | 0 | 0 | 0.4 | 0.05 | −0.05 | 0.41 | 0.04 | −0.07 | 0.43 |
| | 0.4 | 0.4 | 0.4 | 0.40 | −0.02 | −0.06 | 0.40 | −0.03 | 0.07 |
| | 0.5 | 0.5 | 0.5 | 0.5 | −0.03 | 0.07 | 0.5 | −0.03 | 0.07 |
| | 0.6 | 0 | 0 | 0.17 | 0.40 | −0.17 | 0.18 | 0.39 | −0.11 |
| | 0 | 0.6 | 0 | 0.35 | −0.35 | −0.35 | 0.35 | −0.38 | −0.28 |
| | 0 | 0 | 0.6 | 0.08 | −0.08 | 0.61 | 0.07 | −0.10 | 0.60 |
| | 0.6 | 0.6 | 0.6 | 0.6 | −0.03 | 0.08 | 0.60 | −0.03 | 0.07 |
| | 0.8 | 0 | 0 | 0.23 | 0.53 | −0.23 | 0.24 | 0.53 | −0.17 |
| | 0 | 0.8 | 0 | 0.47 | −0.47 | −0.47 | 0.47 | −0.50 | −0.40 |
| | 0 | 0 | 0.8 | 0.10 | −0.1 | 0.81 | 0.09 | −0.12 | 0.78 |
| | 0.8 | 0.8 | 0.8 | 0.80 | −0.04 | 0.11 | 0.80 | −0.03 | 0.07 |
| | 1 | 0 | 0 | 0.28 | 0.67 | −0.28 | 0.30 | 0.67 | −0.23 |
| | 0 | 1 | 0 | 0.59 | −0.59 | −0.59 | 0.59 | −0.62 | −0.52 |
| | 0 | 0 | 1 | 0.13 | −0.13 | 1.01 | 0.11 | −0.14 | 0.96 |
| White | 1 | 1 | 1 | 1.00 | −0.05 | 0.14 | 1.00 | −0.03 | 0.07 |

It is a further object of the present invention to provide an image processing device enabling to control the color hue level and the color saturation level as well as to correct the white balance of the input color image.

The above object may be fulfilled by an image processing device applying color adjustment, including the white balance correction, to the luminance signal and the two color difference signals of the input color image, the image processing device comprising a correction coefficient generation unit for generating a two-row one-column matrix and a two-row two-column matrix, the two-row one-column matrix being comprised of two correction coefficients to be applied to the luminance signal and the two-row two-column matrix being comprised of four coefficients to be applied to the two color difference signals, a first multiplier for multiplying the luminance signal by the two-row one-column matrix, a second multiplier for multiplying a two-row one-column matrix including the two color difference signals by the two-row two-column matrix, an adder for obtaining correction values for the two color difference signals by operating a two-row one-column matrix which is made of multiplication result of the first multiplier and multiplication result of the second multiplier.

The two-row one-column matrix generated by the correction coefficient generation unit may be:

$$\begin{bmatrix} Kr - 1 \\ Kb - 1 \end{bmatrix}; \text{ and}$$

and the two row two-column matrix generated by the correction coefficient generation unit may be:

$$\begin{bmatrix} 0.3 + 0.7Kr \\ 0.3 - 0.3Kr \end{bmatrix} \begin{bmatrix} 0.11 - 0.11Kb \\ 0.11 + 0.89Kb \end{bmatrix}, \text{ in which}$$

in which Kr and Kb indicate amplitude of an R signal and amplitude of a B signal respectively.

The above construction is much simpler than the circuit realizing Formula 3 for the conventional white balance correction to be applied to the luminance signal and the color difference signals. Furthermore, the white balance correction realized by the above construction is as effective as for Formula 3 since it simply ignores effect of the luminance signal on the white balance correction.

Although the accuracy of white balance correction deteriorates in small degree, further simplification of the circuit may be achieved by the image processing device, wherein the two-row one-column matrix generated by the correction coefficient generation unit is:

$$\begin{bmatrix} Kr - 1 \\ Kb - 1 \end{bmatrix}, \text{ and}$$

and the two-row two-column matrix generated by the correction coefficient generation unit is a unit matrix, in which Kr and Kb indicate amplitudes of an R signal and amplitude of a B signal respectively.

Further, the two-row one-column matrix generated by the correction coefficient generation unit may be:

$$\begin{bmatrix} -S\cos\theta \cdot (Kr - 1) + S\sin\theta \cdot (Kb - 1) \\ -S\sin\theta \cdot (Kr - 1) + S\cos\theta \cdot (Kb - 1) \end{bmatrix} \text{ and}$$

and the two-row two-column matrix may be:

$$\begin{bmatrix} S\cos\theta \cdot (0.3 + 0.7Kr) & S\cos\theta \cdot (0.11 - 0.11Kb) \\ +S\sin\theta \cdot (0.3 - 0.3Kr) & +S\sin\theta \cdot (0.11 + 0.89Kb) \\ -S\sin\theta \cdot (0.3 + 0.7Kr) & -S\sin\theta \cdot (0.11 - 0.11Kb) \\ +S\cos\theta \cdot (0.3 - 0.3Kr) & +S\cos\theta \cdot (0.11 + 0.89Kb) \end{bmatrix},$$

Kr and Kb being amplitudes of an R signal and amplitudes of a B signal respectively, S being a color saturation correction value, and θ being a color hue correction value.

The circuit possessing this construction can control the color hue and the saturation level of the color image besides making the accurate white balance correction; moreover, such circuit will be more simple than the conventional circuit realizing Formula 3.

BRIEF DESCRIPTION OF THE DRAWING

These and other objects, advantages and features of the invention will become apparent from the following description thereof taken in conjunction with the accompanying drawings which illustrate a specific embodiment of the invention. In the drawing.

DESCRIPTION OF THE PREFERRED EMBODIMENTS

Embodiment 1

Figure 1:
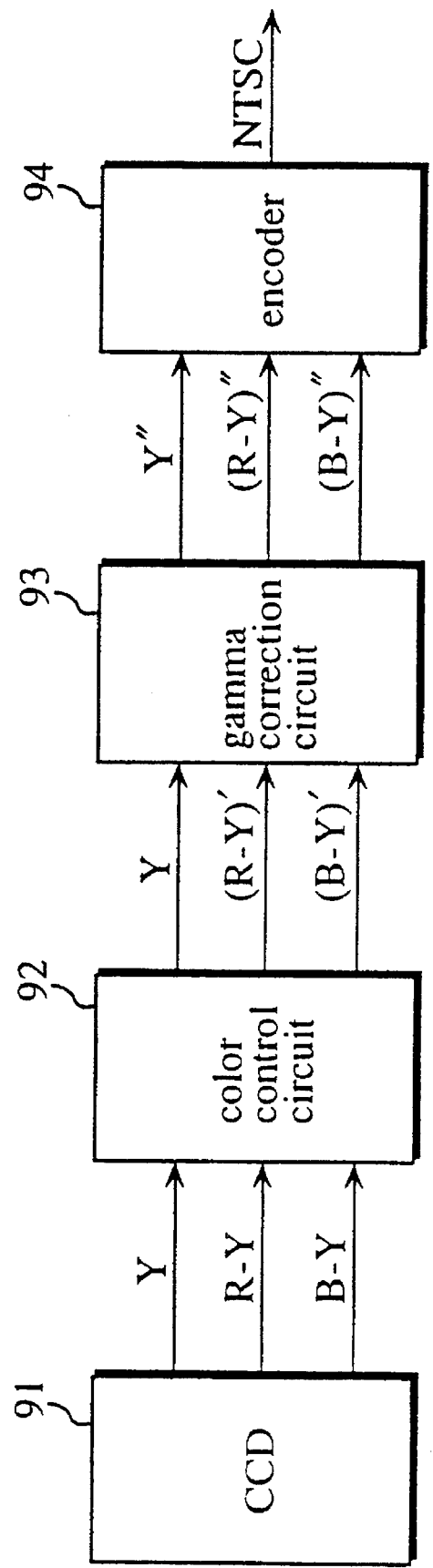
FIG. 1 is a block diagram showing a conventional image processing device.
Figure 2:
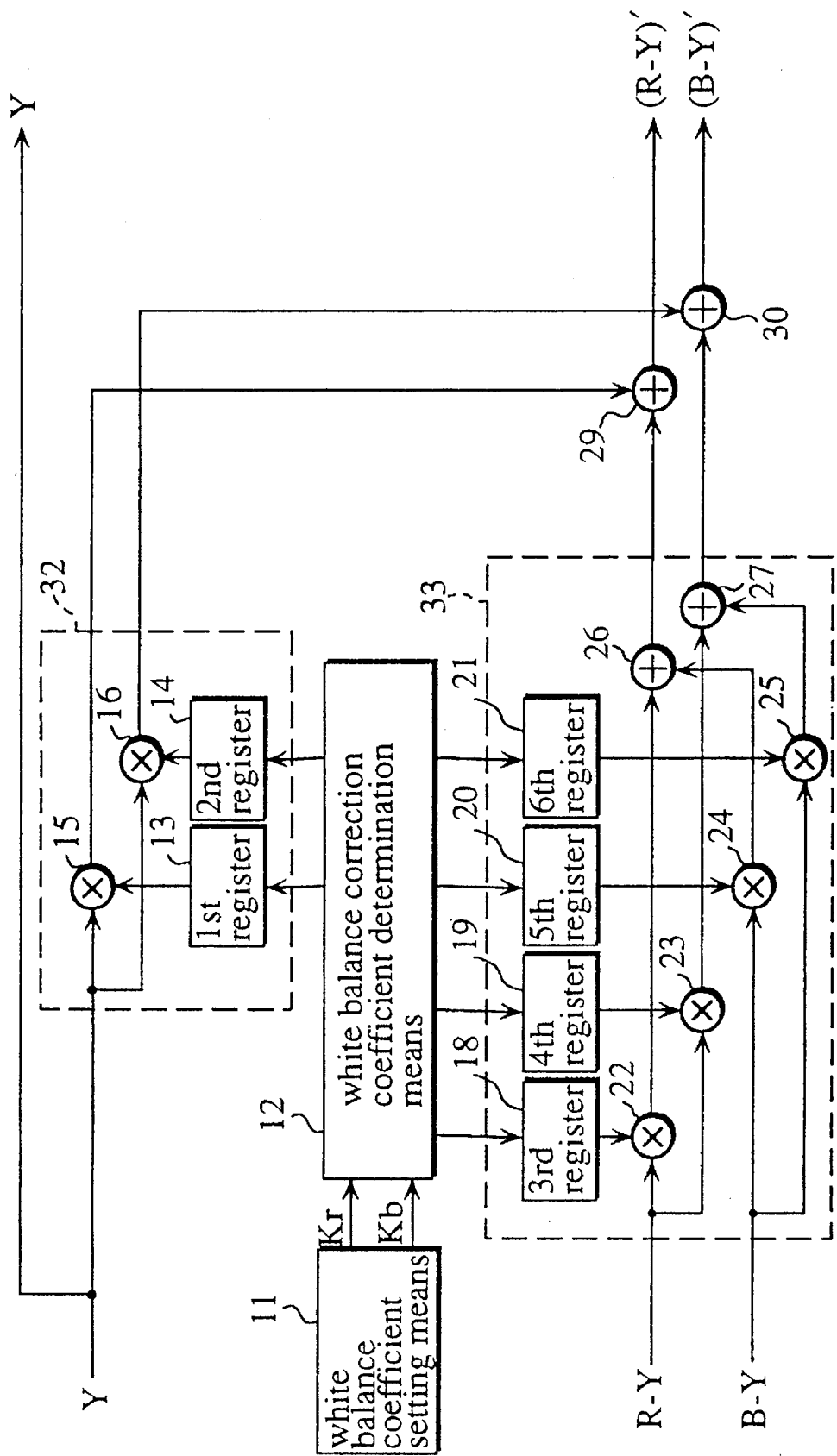
FIG. 2 is a circuit block diagram depicting major part of an image signal processing device in a first embodiment of the present invention.
Figure 3:
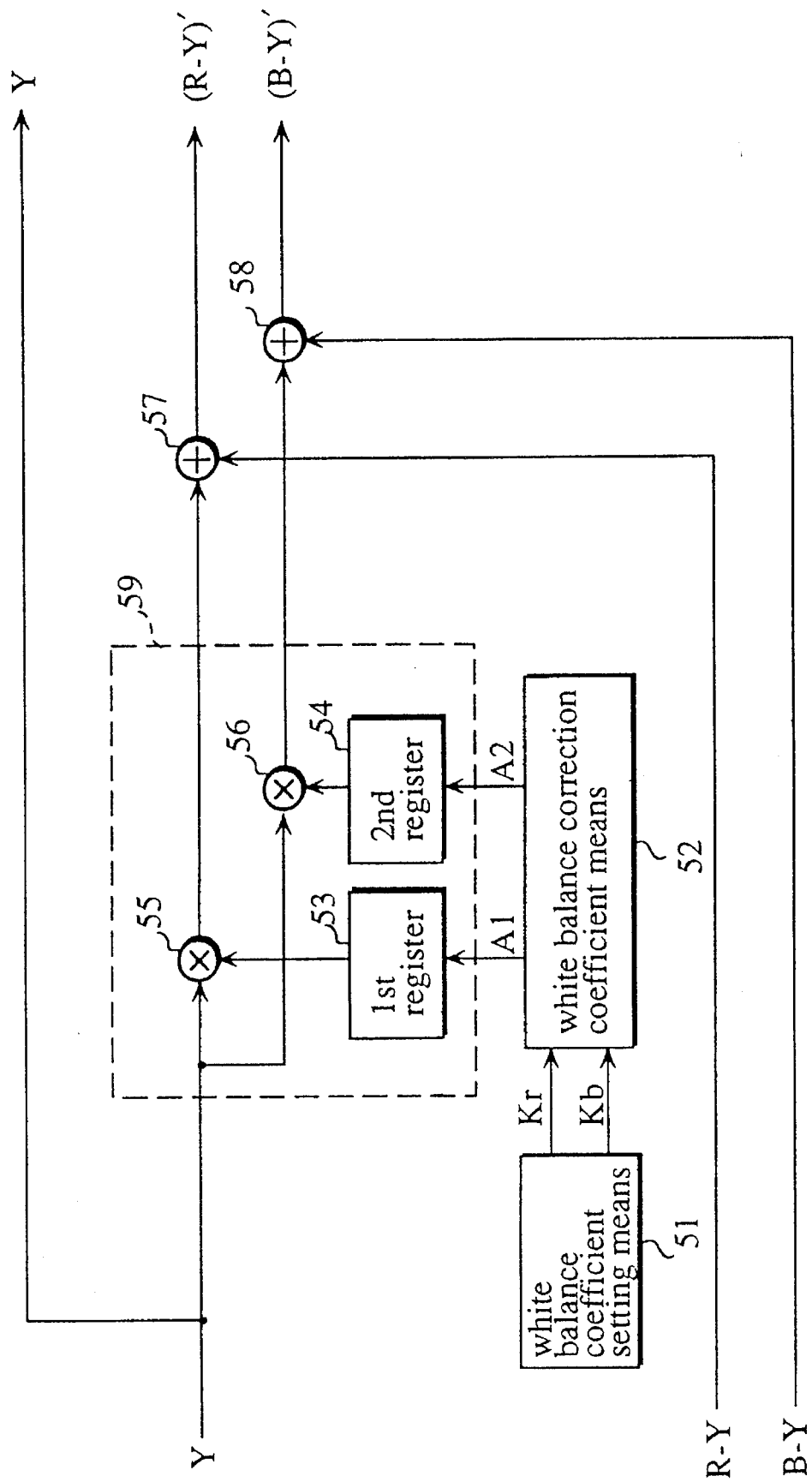
FIG. 3 is a circuit block diagram depicting an image signal processing device in a second embodiment of the present invention.

An image signal processing device in a first embodiment will be described with reference to FIG. 2. As shown in the figure, the image signal processing device comprises a white balance coefficient setting means 11, a white balance correction coefficient determination means 12, a first register 13, a second register 14, a first multiplier 15, a second multiplier 16, a third register 18, a fourth register 19, a fifth register 20, a sixth register 21, a third multiplier 22, a fourth multiplier 23, a fifth multiplier 24, a sixth multiplier 25, an R adder 26, a B adder 27, a first adder 29, and a second adder 30. The first register 13, the second register 14, the first multiplier 15, and the second multiplier 16 constitute luminance signal operation means 32; and the third register 18, the fourth register 19, the fifth register 20, the sixth register 21, the third multiplier 22, the fourth multiplier 23, the fifth multiplier 24, the sixth multiplier 25, the R adder 26 and the B adder 27 constitute matrix operation means 33.

The white balance coefficient setting means 11 determines a ratio of amplitudes in Red (R), Green (G), and Blue (B) signals, which will be reflected on white balance coefficients Kr, Kg, and Kb respectively. More specifically, the white balance coefficients can be set by hand with a variable resistor (not illustrated); otherwise can be set automatically responding to the input signals. As has been described in Formula 2, the white balance coefficients Kr, Kg, and Kb are related to each other; therefore, only the white balance coefficients Kr and Kb will be outputted from the white balance coefficient setting means 11.

The white balance correction coefficient determination means 12 determines white balance correction coefficients A1, A2 included in a first white balance correction coefficient group as well as B1, B2, B3 and B4 included in a second white balance correction coefficient group responding to the white balance coefficients Kr and Kb received from the white balance coefficient setting means 11. This determination is shown in Formulae 5–10 respectively. The first white balance correction coefficient group will be applied to the luminance signal Y; and the second white balance correction coefficient group will be applied to the color difference signals R-Y and B-Y.

$$A1 = Kr - 1 \qquad \text{Formula 5}$$

$$A2 = Kb - 1 \qquad \text{Formula 6}$$

$$B1 = 0.3 + 0.7Kr \qquad \text{Formula 7}$$

$$B2 = 0.3 - 0.3Kr \qquad \text{Formula 8}$$

$$B3 = 0.11 - 0.11Kb \qquad \text{Formula 9}$$

$$B4 = 0.11 + 0.89Kb \qquad \text{Formula 10}$$

The first register 13 is provided with the white balance correction coefficient A1 obtained at the white balance correction coefficient determination means 12.

The second register 14 is provided with the white balance correction coefficient A2 obtained at the white balance correction coefficient determination means 12.

The first multiplier 15 multiplies input of the luminance signal Y by the coefficient A1 set at the first register 13.

The second multiplier 16 multiplies input of the luminance signal Y by the coefficient A2 set at the second register 14.

The third register 18 is provided with the white balance correction coefficient B1 obtained at the white balance correction coefficient determination means 12.

The fourth register 19 is provided with the white balance correction coefficient B2 obtained at the white balance correction coefficient determination means 12.

The fifth register 20 is provided with the white balance correction coefficient B3 obtained at the white balance correction coefficient determination means 12.

The sixth register 21 is provided with the white balance correction coefficient B4 obtained at the white balance correction coefficient determination means 12.

The third multiplier 22 multiplies input of the color difference signal R-Y by the coefficient B1 set at the third register 18.

The fourth multiplier 23 multiplies input of the color difference signal R-Y by the coefficient B2 set at the fourth register 19.

The fifth multiplier 24 multiplies input of the color difference signal B-Y by the coefficient B3 set at the fifth register 20.

The sixth multiplier 25 multiplies input of the color difference signal B-Y by the coefficient B4 set at the sixth register 21.

The R adder 26 adds multiplication result of the third multiplier 22 and multiplication result of the fifth multiplier 24 together.

The B adder 27 adds multiplication result of the fourth multiplier 23 and multiplication result of the sixth multiplier 25 together.

The first adder 29 adds multiplication result of the first multiplier 15 and adding result of the R adder 26 together.

The second adder 30 adds multiplication result of the second multiplier 16 and adding result of the B adder 27 together.

Corrected color difference signals (R-Y)', (B-Y)' obtained from operations at the adders 26, 27, 29, 30 as well as at the multipliers 15, 16, 22–25 are shown in Formula 11. In the formula input of the luminance signal Y and input of the original color difference signals Y, R-Y, and B-Y are employed.

$$\begin{bmatrix} (R-Y)' \\ (B-Y)' \end{bmatrix} = \begin{bmatrix} Kr-1 \\ Kb-1 \end{bmatrix} Y + \begin{bmatrix} 0.3 + 0.7Kr & 0.11 - 0.11Kb \\ 0.3 - 0.3Kr & 0.11 + 0.89Kb \end{bmatrix} \begin{bmatrix} R-Y \\ B-Y \end{bmatrix} \qquad \text{[Formula 11]}$$

It is apparent from this formula that the corrected color difference signals (R-Y)', (B-Y)' are adding result of the luminance signal Y and the original color difference signals R-Y, B-Y.

Comparing this formula to the Formula 3 for the conventional white balance correction, it is found that correction realized in Formula 11 is part of the Formula 3. More specifically, only obtainment of the corrected color difference signals (R-Y)' and (B-Y)' is realized, and obtainment of the corrected luminance signal Y' in Formula 3 is missing therein. The luminance signal Y hardly effects the white balance correction while the color-balance R-Y and B-Y signals do; therefore, it is expected that the luminance signal Y can be ignored in the white balance correction although the color difference signals R-Y, B-Y cannot be ignored to realize effective white balance correction.

Few effects of the luminance signal Y on the white balance correction were confirmed when Formula 11 was realized highly accurately. Various input signals are provided to Formula 3 and Formula 11; and results thereof to the same input signals are compared to each other in Table 2-1. As apparent from the table, the outcome of Formula 11 is nearly consistent with Formula 3 having the biggest difference therebetween only 0.01–0.02; thus, it is found that the white balance correction in Formula 11 is as effective as the white balance correction in Formula 3. Further, six multipliers and four adders are enough to implement Formula 11; therefore, this circuit will be much more simple than the circuit realizing Formula 3.

The luminance signal and the color difference signals in Table 2-1 are converted into RGB signals to be expressed in 256 gradation. Table 2-2 shows the correction results expressed in 256 gradation. As shown in the table, it is apparent that the corrected RGB signals are quite similar to the ideal RGB signals. That is, it is confirmed in this table that the highly accurate white balance correction in Formula 11 is highly accurate.

Embodiment 2

In a second embodiment the circuit realizing the white balance correction is further simplified, and this includes white balance coefficient setting means 51, white balance correction coefficient determination means 52, a first register 53, a second register 54, a first multiplier 55, a second multiplier 53, a first adder 57, and a second adder 58.

The first register 53, the second register 54, the first multiplier 55, and the second multiplier 56 constitute luminance signal operation means 59.

The white balance coefficient setting means 51

TABLE 2-1

Comparison of 1st embodiment to conventional white balance correction
(R:G:B = 0.95:1:1.14 lighting source: incandescent lamp)

| input signals | | | ideal signals | | | obtained signals | | |
|---|---|---|---|---|---|---|---|---|
| R | G | B | Y | R-Y | B-Y | Y | R-Y | B-Y |
| 0 | 0 | 0 | 0.00 | 0.00 | 0.00 | 0.00 | 0.00 | 0.00 |
| 0.2 | 0 | 0 | 0.06 | 0.13 | −0.06 | 0.06 | 0.13 | −0.06 |
| 0 | 0.2 | 0 | 0.12 | −0.12 | −0.12 | 0.12 | −0.12 | −0.12 |
| 0 | 0 | 0.2 | 0.03 | −0.03 | 0.20 | 0.02 | −0.03 | 0.20 |
| 0.2 | 0.2 | 0.2 | 0.2 | −0.01 | 0.03 | 0.20 | −0.01 | 0.03 |
| 0.4 | 0 | 0 | 0.11 | 0.27 | −0.11 | 0.12 | 0.27 | −0.11 |
| 0 | 0.4 | 0 | 0.24 | −0.24 | −0.24 | 0.24 | −0.24 | −0.24 |
| 0 | 0 | 0.4 | 0.05 | −0.05 | 0.41 | 0.04 | −0.05 | 0.41 |
| 0.4 | 0.4 | 0.4 | 0.40 | −0.02 | −0.06 | 0.40 | −0.02 | 0.06 |
| 0.5 | 0.5 | 0.5 | 0.5 | −0.03 | 0.07 | 0.5 | −0.03 | 0.07 |
| 0.6 | 0 | 0 | 0.17 | 0.40 | −0.17 | 0.18 | 0.40 | −0.17 |
| 0 | 0.6 | 0 | 0.35 | −0.35 | −0.35 | 0.35 | −0.35 | −0.35 |
| 0 | 0 | 0.6 | 0.08 | −0.08 | 0.61 | 0.07 | −0.08 | 0.61 |
| 0.6 | 0.6 | 0.6 | 0.6 | −0.03 | 0.08 | 0.60 | −0.03 | 0.08 |
| 0.8 | 0 | 0 | 0.23 | 0.53 | −0.23 | 0.24 | 0.53 | −0.23 |
| 0 | 0.8 | 0 | 0.47 | −0.47 | −0.47 | 0.47 | −0.47 | −0.47 |
| 0 | 0 | 0.8 | 0.10 | −0.1 | 0.81 | 0.09 | −0.10 | 0.81 |
| 0.8 | 0.8 | 0.8 | 0.80 | −0.04 | 0.11 | 0.80 | −0.04 | 0.11 |
| 1 | 0 | 0 | 0.28 | 0.67 | −0.28 | 0.30 | 0.67 | −0.28 |
| 0 | 1 | 0 | 0.28 | 0.67 | −0.28 | 0.30 | 0.67 | −0.28 |
| 0 | 0 | 1 | 0.13 | −0.13 | 1.01 | 0.11 | −0.13 | 1.01 |
| 1 | 1 | 1 | 1.00 | −0.05 | 0.14 | 1.00 | −0.05 | 0.14 |

TABLE 2-2

Comparison of 1st embodiment to conventional white balance correction in 256 gradation
(R:G:B = 0.95:1:1.14 lighting source: incandescent lamp

| input signals | | | ideal RGB signals | | | obtained RGB signals | | |
|---|---|---|---|---|---|---|---|---|
| R | G | B | R | G | B | R | G | B |
| 0 | 0 | 0 | 0 | 0 | 0 | 0 | 1 | 18 |
| 51 | 0 | 0 | 48 | 0 | 0 | 49 | 1 | 0 |
| 0 | 51 | 0 | 0 | 51 | 0 | 0 | 51 | 0 |
| 0 | 0 | 51 | 0 | 0 | 58 | 0 | 0 | 58 |
| 51 | 51 | 51 | 48 | 51 | 58 | 48 | 51 | 58 |
| 102 | 0 | 0 | 97 | 0 | 0 | 98 | 2 | 0 |
| 0 | 102 | 0 | 0 | 102 | 0 | 0 | 102 | 0 |
| 0 | 0 | 102 | 0 | 0 | 116 | 0 | 0 | 116 |
| 102 | 102 | 102 | 97 | 102 | 116 | 97 | 101 | 116 |
| 128 | 128 | 128 | 121 | 128 | 145 | 121 | 127 | 145 |
| 153 | 0 | 0 | 145 | 0 | 0 | 148 | 3 | 0 |
| 0 | 153 | 0 | 0 | 153 | 0 | 0 | 153 | 0 |
| 0 | 0 | 153 | 0 | 0 | 174 | 0 | 0 | 174 |
| 153 | 153 | 153 | 145 | 153 | 174 | 145 | 153 | 174 |
| 204 | 0 | 0 | 194 | 0 | 0 | 197 | 4 | 0 |
| 0 | 204 | 0 | 0 | 204 | 0 | 0 | 204 | 0 |
| 0 | 0 | 204 | 0 | 0 | 233 | 0 | 0 | 232 |
| 204 | 204 | 204 | 194 | 204 | 233 | 194 | 204 | 233 |
| 255 | 0 | 0 | 242 | 0 | 0 | 246 | 5 | 0 |
| 0 | 255 | 0 | 0 | 255 | 0 | 0 | 255 | 0 |
| 0 | 0 | 255 | 0 | 0 | 255 | 0 | 0 | 255 |
| 255 | 255 | 255 | 242 | 255 | 255 | 242 | 255 | 255 | determines a ratio of amplitudes in Red (R), Green (G), and Blue (B) signals, which will be reflected on white balance coefficients Kr, Kg, and Kb respectively.

The white balance correction coefficient determination means 52 determines the white balance correction coefficients A1 and A2 responding to the white balance coefficients Kr, Kb set at the white balance setting means. The white balance correction coefficients A1 and A2 employed herein are the same as those in the first embodiment; and they will be applied to the luminance signal Y.

The first register 53 is provided with the white balance correction coefficient A1 obtained at the white balance correction coefficient determination means 52.

The second register 54 is provided with the white balance correction coefficient A2 obtained at the white balance correction coefficient determination means 52.

The first multiplier 55 multiplies input of the luminance signal Y by the coefficient A1 set at the first register 53.

The second multiplier 56 multiplies input of the luminance signal Y by the coefficient A2 set at the second register 54.

The first adder 57 adds multiplication result of the first multiplier 55 and input of the color difference signal R-Y together.

The second adder 58 adds multiplication result of the second multiplier 56 and input of the color difference signal B-Y together.

Obtainment of corrected color difference signals (R-Y)', (B-Y)' at the multipliers 55, 56 and the adders 57, 58 is shown in Formula 12, wherein input of the luminance signal Y and input of the original color difference signals R-Y, and B-Y are employed.

$$\begin{bmatrix} (R\text{-}Y)' \\ (B\text{-}Y)' \end{bmatrix} = \begin{bmatrix} Kr-1 \\ Kb-1 \end{bmatrix} Y + \begin{bmatrix} R\text{-}Y \\ B\text{-}Y \end{bmatrix} \quad \text{[Formula 12]}$$

It is apparent from the formula that the corrected color difference signals (R-Y)', (B-Y)' are adding result of input signals including the original luminance signal Y and the original color difference signals R-Y, B-Y. Comparing this formula to Formula 11, it is found that this formula is obtained by replacing the coefficients for the input signals R-Y, B-Y in Formula 11 with 1. Results of the white balance correction in Formula 12 are shown in Table 3-1. In the table ideal luminance signal and the ideal corrected color difference signals are the same as those in Table 2-1, that is, those obtained from Formula 3 are considered as ideal signals.

As shown in the table, difference between the ideal signals and the obtained corrected signals lies within 0.01–0.02 for most of the input signals except for the biggest difference of 0.07 between the corrected B-Y signal in responding to input of R=G=0 and B=0.6. Thus, the differences between the corrected signals and the ideal signals are small enough to be ignored; and the color image reproduced from the corrected signals will be fairly accurate to the input color image. The luminance signal and the color-difference signals in Table 3-1 are converted into RGB signals to be expressed in 256 gradation, which are shown in Table 3-2.

Embodiment 3

Figure 4:
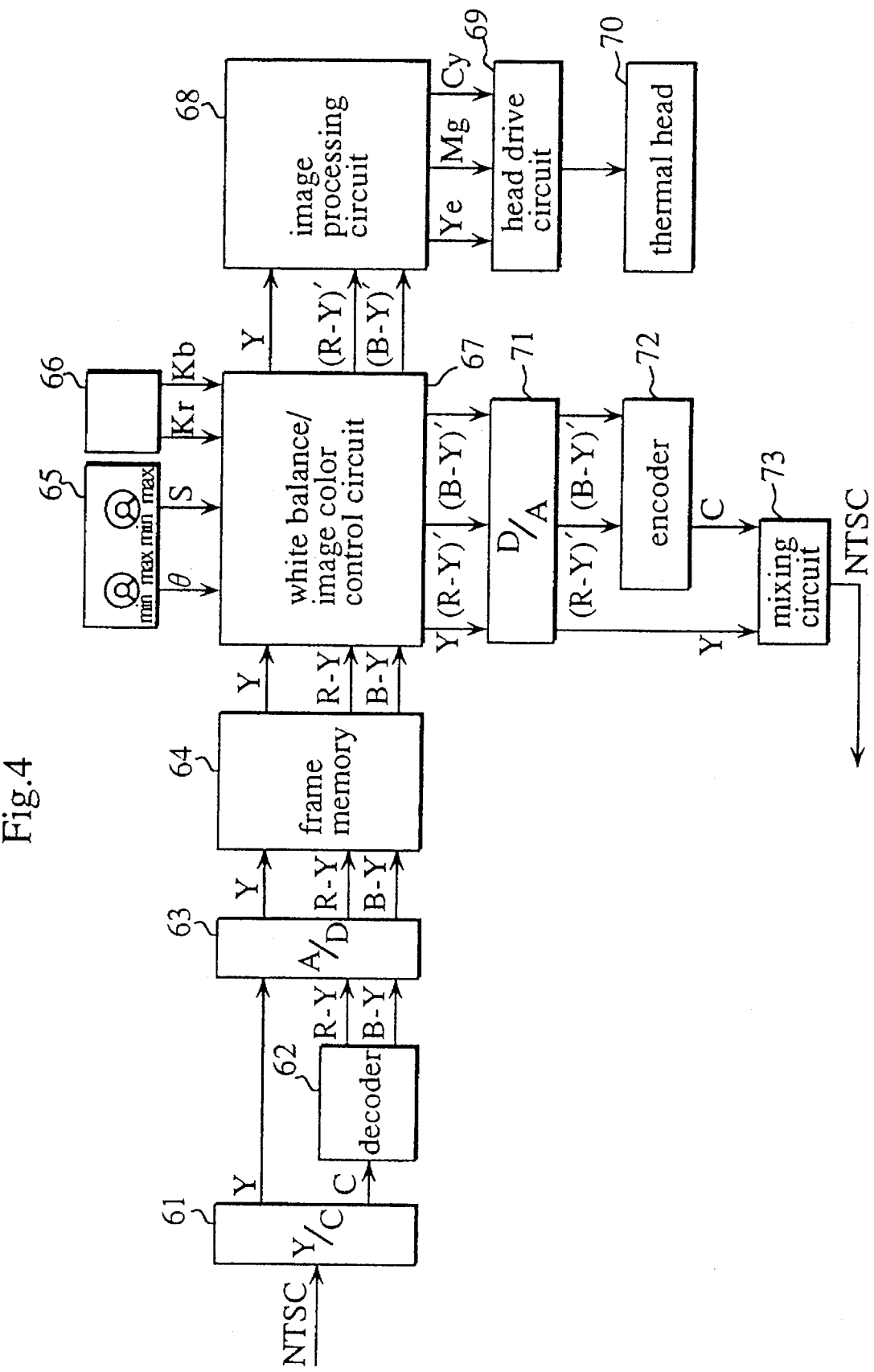
FIG. 4 is a circuit block diagram depicting major part of a printer in a third embodiment which employs the image signal processing device in the second embodiment.

A printer equipped with the image signal processing device is employed in the third embodiment; and such printer is shown in FIG. 4. In the figure the printer comprises a YC separation circuit 61, a decoder 62, an A/D converter 63, a frame memory 64, color hue/color saturation correction value setting means 65, white balance coefficient setting means 66, a white balance/image color control circuit 67, an image processing circuit 68, a head drive circuit 69, a thermal head 70, a D/A converter 71, an encoder 72, and a mixing circuit 73.

The YC separation circuit 61 divides input of NTSC signal into luminance signal Y and Chroma signal C.

The decoder 62 converts the Chroma signal C received from the YC separation circuit 61 into color difference signals R-Y and B-Y.

The A/D converter digitizes the color difference signals R-Y and B-Y provided by the decoder 62.

The frame memory 64 holds luminance signal Y and color difference signals R-Y and B-Y for single frame image.

TABLE 3-1

Comparison of 2nd embodiment to conventional white balance correction
(R:G:B = 0.95:1:1.14 lighting source: incandescent lamp)

| input signals | | | ideal signals | | | obtained signals | | |
|---|---|---|---|---|---|---|---|---|
| R | G | B | Y | R-Y | B-Y | Y | R-Y | B-Y |
| 0 | 0 | 0 | 0.00 | 0.00 | 0.00 | 0.00 | 0.00 | 0.00 |
| 0.2 | 0 | 0 | 0.06 | 0.13 | −0.06 | 0.06 | 0.14 | −0.05 |
| 0 | 0.2 | 0 | 0.12 | −0.12 | −0.12 | 0.12 | −0.12 | −0.10 |
| 0 | 0 | 0.2 | 0.03 | −0.03 | 0.20 | 0.02 | −0.02 | 0.16 |
| 0.2 | 0.2 | 0.2 | 0.2 | −0.01 | 0.03 | 0.20 | −0.01 | 0.03 |
| 0.4 | 0 | 0 | 0.11 | 0.27 | −0.11 | 0.12 | 0.27 | −0.10 |
| 0 | 0.4 | 0 | 0.24 | −0.24 | −0.24 | 0.24 | −0.25 | −0.20 |
| 0 | 0 | 0.4 | 0.05 | −0.05 | 0.41 | 0.04 | −0.05 | 0.36 |
| 0.4 | 0.4 | 0.4 | 0.40 | −0.02 | −0.06 | 0.40 | −0.02 | 0.06 |
| 0.5 | 0.5 | 0.5 | 0.5 | −0.03 | 0.07 | 0.5 | −0.03 | 0.07 |
| 0.6 | 0 | 0 | 0.17 | 0.40 | −0.17 | 0.18 | 0.41 | −0.15 |
| 0 | 0.6 | 0 | 0.35 | −0.35 | −0.35 | 0.35 | −0.37 | −0.30 |
| 0 | 0 | 0.6 | 0.08 | −0.08 | 0.61 | 0.07 | −0.07 | 0.54 |
| 0.6 | 0.6 | 0.6 | 0.6 | −0.03 | 0.08 | 0.60 | −0.03 | 0.08 |
| 0.8 | 0 | 0 | 0.23 | 0.53 | −0.23 | 0.24 | 0.55 | −0.21 |
| 0 | 0.8 | 0 | 0.47 | −0.47 | −0.47 | 0.47 | −0.50 | −0.41 |
| 0 | 0 | 0.8 | 0.10 | −0.1 | 0.81 | 0.09 | −0.09 | 0.72 |
| 0.8 | 0.8 | 0.8 | 0.80 | −0.04 | 0.11 | 0.80 | −0.04 | 0.11 |
| 1 | 0 | 0 | −0.28 | 0.67 | −0.28 | 0.30 | 0.69 | −0.26 |
| 0 | 1 | 0 | 0.59 | −0.59 | −0.59 | 0.59 | −0.62 | −0.51 |
| 0 | 0 | 1 | 0.13 | −0.13 | 1.01 | 0.11 | −0.12 | 0.91 |
| 1 | 1 | 1 | 1.00 | −0.05 | 0.14 | 1.00 | −0.05 | 0.14 |

TABLE 3-2

Comparison of 2nd embodiment to conventional white balance correction in 256 gradation
(R:G:B = 0.95:1:1.14 lighting source: incandescent lamp

| input signals | | | ideal RGB signals | | | obtained RGB signals | | |
|---|---|---|---|---|---|---|---|---|
| R | G | B | R | G | B | R | G | B |
| 0 | 0 | 0 | 0 | 0 | 0 | 0 | 1 | 18 |
| 51 | 0 | 0 | 48 | 0 | 0 | 50 | 0 | 2 |
| 0 | 51 | 0 | 0 | 51 | 0 | 0 | 51 | 4 |
| 0 | 0 | 51 | 0 | 0 | 58 | 0 | 0 | 52 |
| 51 | 51 | 51 | 48 | 51 | 58 | 48 | 51 | 58 |
| 102 | 0 | 0 | 97 | 0 | 0 | 100 | 0 | 4 |
| 0 | 102 | 0 | 0 | 102 | 0 | 0 | 102 | 8 |
| 0 | 0 | 102 | 0 | 0 | 116 | 0 | 0 | 104 |
| 102 | 102 | 102 | 97 | 102 | 116 | 97 | 101 | 116 |
| 128 | 128 | 128 | 121 | 128 | 145 | 121 | 127 | 145 |
| 153 | 0 | 0 | 145 | 0 | 0 | 151 | 0 | 6 |
| 0 | 153 | 0 | 0 | 153 | 0 | 0 | 153 | 13 |
| 0 | 0 | 153 | 0 | 0 | 174 | 0 | 0 | 155 |
| 153 | 153 | 153 | 145 | 153 | 174 | 145 | 153 | 174 |
| 204 | 0 | 0 | 194 | 0 | 0 | 201 | 0 | 9 |
| 0 | 204 | 0 | 0 | 204 | 0 | 0 | 204 | 17 |
| 0 | 0 | 204 | 0 | 0 | 233 | 0 | 0 | 207 |
| 204 | 204 | 204 | 194 | 204 | 233 | 194 | 204 | 233 |
| 255 | 0 | 0 | 242 | 0 | 0 | 251 | 0 | 11 |
| 0 | 255 | 0 | 0 | 255 | 0 | 0 | 255 | 21 |
| 0 | 0 | 255 | 0 | 0 | 255 | 0 | 0 | 255 |
| 255 | 255 | 255 | 242 | 255 | 255 | 242 | 255 | 255 |

The color hue/color saturation correction value setting means 65 determines correction value to correct hue and saturation level of the one-frame image stored in the frame memory 64.

The white balance coefficient setting means 66 determines a ratio of amplitudes in image signals Red (R), Green (G), and Blue (B), which will be reflected on white balance coefficients Kr, Kg, and Kb. Such white balance coefficients Kr, Kg, and Kb are the same as in the first and the second embodiments.

The white balance/image color control circuit 67 corrects white balance and chroma of input image in accordance with the white balance coefficients at the white balance coefficient setting means 66 as well as the correction value at the color hue/color saturation correction value setting means 65.

The image processing circuit 68 provides the edge emphasis processing, the color correction, the color conversion and the like to output of the white balance/image color control circuit 67; and outputs Ye, Mg, Cy signals responding to yellow, magenta, and cyan primary color components of the processed image.

The head drive circuit 69 prints an image in accordance with the Ye, Mg, Cy signals received from the image processing circuit 68 as well as an output signal from the thermal head 70.

The D/A converter 71 receives the luminance signal Y and the corrected color difference signals (R-Y)', (B-Y)' obtained from the white balance correction as well as the color hue/color saturation correction at the white balance/image color control circuit 67; and converts them from the digital form into the analog form. The luminance signal Y and the corrected color difference signals (R-Y)' (B-Y)' are the same as signal input of the image processing circuit 68.

The encoder 72 converts the corrected color difference signals (R-Y)' and (B-Y)' received from the D/A converter 71 in their analog form into the Chroma signal C.

The mixing circuit 73 generates the NTSC signal by combining the luminance signal Y received from the D/A converter 71 and the Chroma signal C received from the encoder 72. The generated NTSC will be inputted to a CRT (Cathode Ray Tube).

Figure 5:
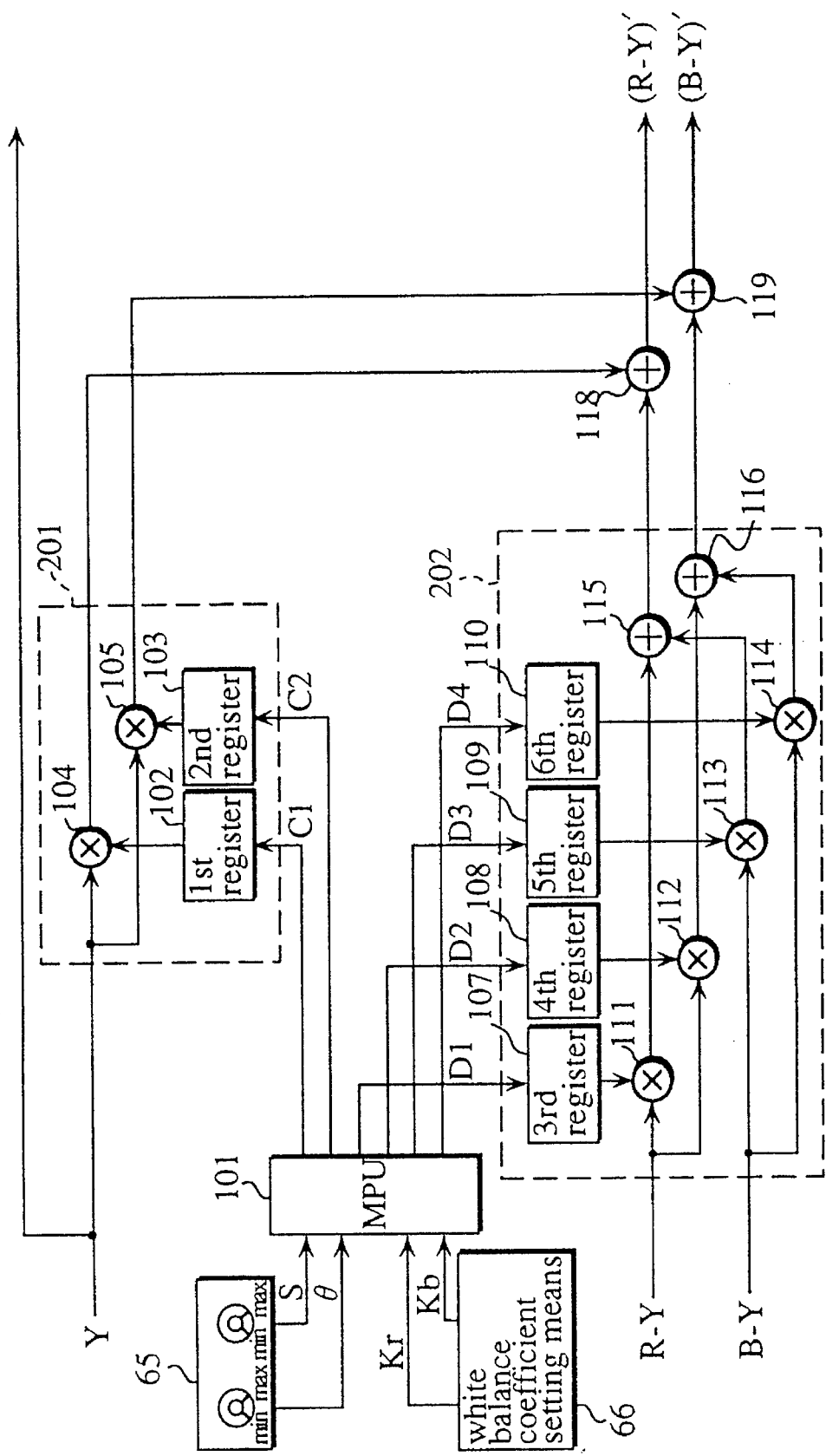
FIG. 5 is a circuit block diagram depicting a white balance/color control circuit.

Detail of the white balance/image color control circuit 67 is shown in FIG. 5, comprising an MPU (MicroProcessor unit), a first register 102, a second register 103, a first multiplier 104, a second multiplier 105, a third register 107, a fourth register 108, a fifth register 109, a sixth register 110, a third multiplier 111, a fourth multiplier 112, a fifth multiplier 113, a sixth multiplier 114, an R adder 115, a B adder 116, a first adder 118, and a second adder 119.

The first register 102, the second register 103, the first multiplier 104, and the second multiplier 105 constitute luminance signal operation means 201; and the third register 107, the fourth register 108, the fifth register 109, the sixth register 110, the third multiplier 111, the fourth multiplier 112, the fifth multiplier 113, the sixth multiplier 114, the R adder 115 and the B adder 116 constitute matrix operation means 202.

The MPU 101, including a one-tip microcomputer and the like, obtains correction values C1, C2 included in a first color difference correction coefficient group as well as correction values D1, D2, D3, D4 included in a second color difference correction coefficient group in accordance with the amplitudes of the R signal and the B signal. The amplitudes of the R and the B signals are reflected on white balance coefficients Kr and Kb respectively. The MPU 101 then provides the obtained C1, C2, D1–D4 to the registers 102, 103, 107–110 respectively. Formulae 13–18 shows such obtainment of C1, C2, D1–D4.

$$C1 = S\cos\theta \cdot (Kr-1) + S\sin\theta \cdot (Kb-1) \quad \text{Formula 13}$$

$$C2 = -S\sin\theta \cdot (Kr-1) + S\cos\theta \cdot (Kb-1) \quad \text{Formula 14}$$

$$D1 = S\cos\theta \cdot (0.3+0.7Kr) + S\sin\theta \cdot (0.3-0.3Kr) \quad \text{Formula 15}$$

$$D2 = -S\sin\theta \cdot (0.3+0.7Kr) + S\cos\theta \cdot (0.3-0.3Kr) \quad \text{Formula 16}$$

$$D3 = S\cos\theta \cdot (0.11-0.11Kb) + S\sin\theta \cdot (0.11+0.89Kb) \quad \text{Formula 17}$$

$$D4 = -S\sin\theta \cdot (0.11-0.11Kb) + S\cos\theta \cdot (0.11+0.89Kb) \quad \text{Formula 18}$$

Operations of the multipliers 104, 105, 111–114 and the adders 115, 116, 118, 119 are shown in Formula 19.

$$\begin{bmatrix} (R-Y)' \\ (B-Y)' \end{bmatrix} = \begin{bmatrix} C1 \\ C2 \end{bmatrix} Y + \begin{bmatrix} D1 & D3 \\ D2 & D4 \end{bmatrix} \begin{bmatrix} R-Y \\ B-Y \end{bmatrix} \quad [\text{Formula 19}]$$

In this formula the coefficients C1, C2, D1–D4 are substituted with the values obtained at the formulae 13–18 respectively. The formula 19 can be rewritten into Formula 20.

$$\begin{bmatrix} (R-Y)' \\ (B-Y)' \end{bmatrix} = \begin{bmatrix} S\cos\theta & S\sin\theta \\ -S\sin\theta & S\cos\theta \end{bmatrix} \begin{bmatrix} Kr-1 \\ Kb-1 \end{bmatrix} Y + \begin{bmatrix} S\cos\theta & S\sin\theta \\ -S\sin\theta & S\cos\theta \end{bmatrix} \begin{bmatrix} 0.3+0.7Kr & 0.11-0.11kb \\ 0.3-0.3Kr & 0.11+0.89Kb \end{bmatrix} \begin{bmatrix} R-Y \\ B-Y \end{bmatrix} \quad [\text{Formula 20}]$$

This formula indicates that the value obtained from the white balance correction in the first embodiment will be rotated in degree of a color hue correction value θ and will be enlarged by a color saturation correction value S.

Operation of the printer in FIG. 4 will be described now. When the NTSC signal is inputted to the printer, it is divided into the luminance signal Y and the Chroma signal C at the YC separation circuit 61. The luminance signal Y is inputted to the A/D converter 63, and the Chroma signal C is inputted to the decoder 62. The Chroma signal C is decoded into the color difference signals R-Y, B-Y, and they are provided to the A/D converter 63. The luminance signal Y and the color difference signals R-Y, B-Y at the A/D converter 63 are then sent to the frame memory 64. The luminance signal Y and the color difference signals R-Y, B-Y for single frame are stored into the frame memory 64. User of the printer provides the white balance coefficients Kr, Kb to the white balance coefficient setting means 66 as well as provides the color hue correction value θ and the color saturation control value S to the color hue/color saturation correction value setting means 65. The color difference signal correction coefficients C1, C2, D1–D4 are computed at the MPU 101, and each of the obtained color difference signal correction coefficients C1, C2, D1–D4 is given to the first register 102, the second register 103, the third register 107, the fourth register 108, the first register 109, and the sixth register 110 respectively. The luminance signal Y received from the frame memory 64 is multiplied by the coefficient C1 provided by the first register 102 at the first multiplier 104, as well as multiplied by the coefficient C2 provided by the second register at the second multiplier 105. The color difference signal R-Y also received from the frame memory 64 is multiplied by the coefficient D1 received from the third register 107 at the third multiplier, as well as multiplied by the coefficient D2 received from the fourth register 108 at the fourth multiplier 108. The color difference signal B-Y received from the frame memory 64 is multiplied by the coefficient D3 received from the fifth register 109 at the fifth multiplier 113, as well as multiplied by the coefficient D4 received from the sixth register 110 at the sixth multiplier 114. Multiplication result of the third multiplier 111 and multiplication result of the fifth multiplier 113 are added together at the R adder 115; and multiplication result of the fourth multiplier 112 and multiplication result of the sixth multiplier 114 are added together at the B adder 116. Corrected color difference signal (R-Y)' is obtained at the first adder 118 by adding multiplication result of the first multiplier 104 and adding result of the R adder 115 together; and the signal (R-Y)' is provided to the image processing circuit 68 and to the D/A converter 71. Corrected color difference signal (B-Y)' is obtained at the second adder 119 by adding multiplication result of the second multiplier 105 and adding result of the B adder 116 together; and the signal (B-Y)' is provided to the image processing device 68 and to the D/A converter 71. Hence, both the corrected color difference signals (R-Y)' and (B-Y)' are obtained and provided to the D/A converter 71.

At the image processing circuit 68, the edge emphasis processing, the color correction, the color conversion and the like are provided to the corrected color difference signals (R-Y)' and (B-Y)' as well as to the original luminance signal Y; and Ye, Mg, and Cy signals are generated in accordance with yellow, magenta, and cyan primary color components of the input image. Ye, Mg, and Cy signals are then sent to the head drive circuit 69. At the head drive circuit 69, Ye, Mg, and Cy signals are converted into the pulse signals, and the pulse signals are sent to the thermal head 70. Thus, the pulse signals are generated from the corrected signals obtained from the white balance correction; therefore, its color correction including the white balance correction was completed when the color image is reproduced in accordance with such pulse signals.

At the D/A converter 71 another corrected color difference signals (R-Y)', (B-Y)' and the original luminance signal Y are D/A converted; analog color difference signals (R-Y)', (B-Y)' and analog luminance signal Y are provided to the encoder 72; the analog color difference signals (R-Y)', (BY)' are converted into the Chroma C signal at the encoder 72; and the Chroma C signal is sent to the mixing circuit 73. At the mixing circuit 73 the Chroma C signal and the luminance signal Y are combined to generate the NTSC signal; and the NTSC signal is inputted to the CRT (not illustrated). An image is reproduced from the NTSC signal and is displayed at the CRT. This image is nearly same as the image printed at the thermal head 70.

Thus, the image processing device of the present invention comprises the white balance coefficient setting means 66 for setting the white balance coefficients Kr, Kb; the white balance correction coefficient determination means driven by the MPU 101 to determine the coefficients A1, A2 included in the first white balance correction coefficient group to be applied to the luminance signal Y as well as the coefficients B1–B4 included in the second white balance correction coefficient group to be applied to the color difference signals R-Y, B-Y; the color hue control value setting means driven by part of the color hue/color saturation correction value setting means 65 to determine the color hue correction value θ which corrects color hue of the image signal; the color saturation correction value setting means driven by part of the color hue/color saturation correction value setting means 65 to determine the color saturation correction value S which corrects color saturation of the image signal; the color correction coefficient determination means driven by the MPU 101 to determine four color correction coefficients included in the color correction coefficient group to be applied to the color difference signals R-Y, B-Y with referring to the color hue correction value θ and the color saturation correction value S; the first operation means driven by the MPU 101 to newly determine two color difference signal correction coefficients C1, C2 included in the first color difference signal correction coefficient group to be applied to the luminance signal Y responding to the first white balance correction coefficient group A1, A2 set at the white balance correction coefficient determination means and with the color correction coefficient group set at the color correction coefficient determination means; the second operation means driven by the MPU 101 to newly determine four color difference signal correction coefficients D1, D2, D3, D4 included in the second color difference signal correction coefficient group to be applied to the color difference signals R-Y, B-Y in responding to the second white balance correction coefficient group B1, B2, B3, B4 set at the white balance correction coefficient determination means and to the color correction coefficient group set at the color correction coefficient determination means; the luminance signal operation means 201 for obtaining two output signals by multiplying the luminance signal Y by each of the color difference signal correction coefficient C1, C2 included in the first color difference signal correction coefficient group determined at the first coefficient operation means; the matrix operation means 202 for obtaining two output signals by operating two-row two-column matrix comprised of the color difference signal correction coefficients D1, D2, D3, D4 included in the second color difference signal correction coefficient group determined at the second coefficient operation means and the color difference signals R-Y and B-Y; the first adder 118 for adding one of the two output signals from the luminance signal operation means 201 and one of the two output signals from the matrix operation means 202 together; and the second adder 119 for adding the other output signal from the luminance signal operation means 201 and the other output signal from the matrix operation means 202 together. In this construction, the white balance correction is applied to the image signal; then this corrected image signal is employed for further color correction. Consequently, the white balance correction generates nearly wanted corrected color image even from the original color with high degree of saturation. Also, as has been described, the color correction coefficient is reflected on the coefficient for the luminance signal as well as on the coefficients for the color difference signals; consequently, the printer enabling effective color correction can be realized even in simplified construction, the effective color correction being equivalent to the white balance correction to an image signal and further color control to the corrected image signal. If the color correction coefficient were not reflected on the coefficient for the luminance signal, color correction would be applied to uncorrected image signal first; then the white balance correction would be applied thereto. Such white balance correction will never be effective.

Most of the printers available now are equipped with the matrix operation means; therefore, both accurate white balance correction and accurate color correction in Formula 19 can be implemented simply by adding the white balance coefficient setting means 66, the luminance signal operation means 201, and the first and the second adders 118, 119.

Figure 6:
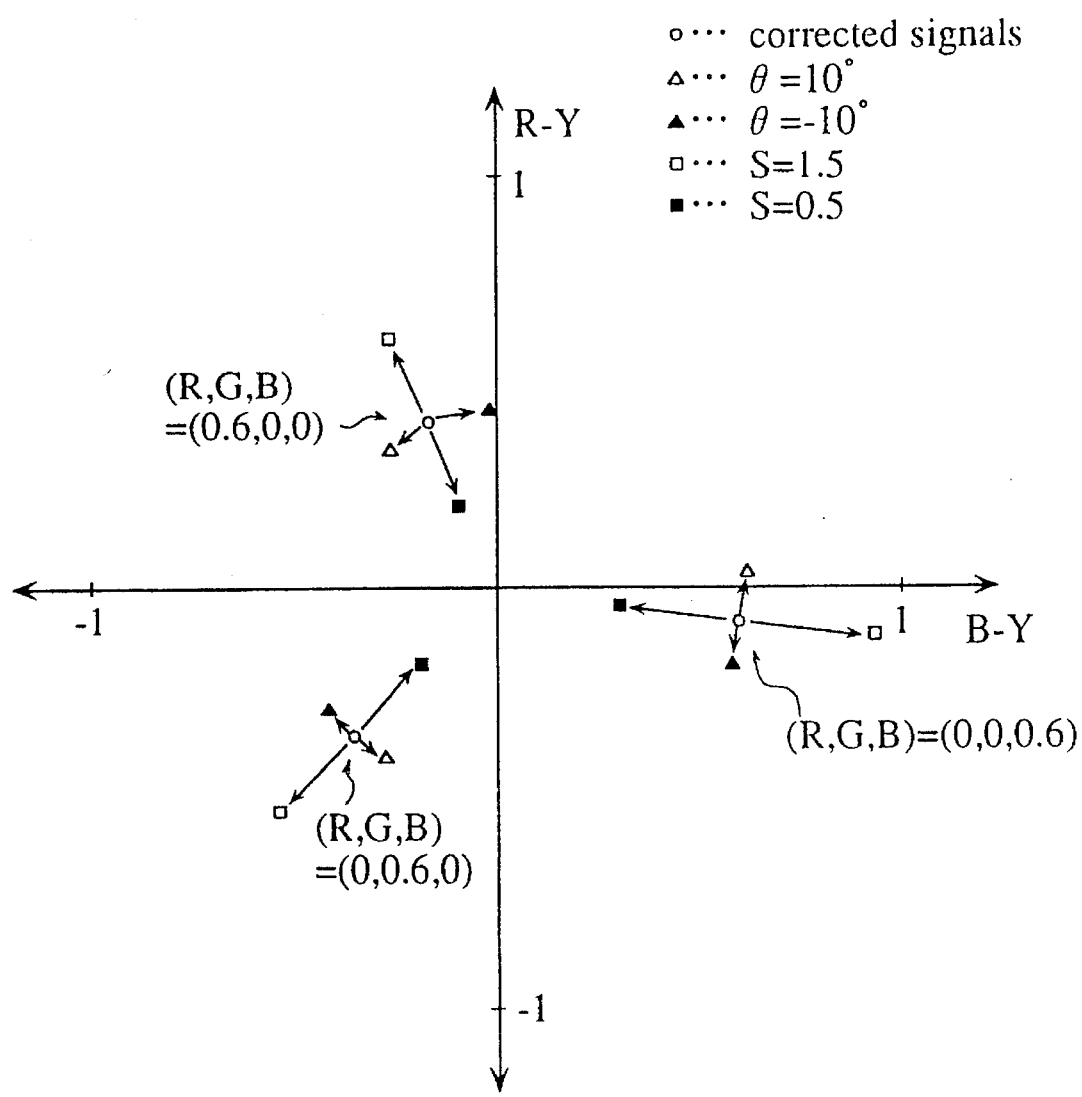
FIG. 6 shows change in the RGB signals in accordance with the color hue control and the color saturation control.

The white balance of the input RGB signals (0.6,0,0)(0, 0.6,0)(0,0,0.6) are corrected at the image processing device in the first embodiment. Then, the color hue level θ of the luminance signal Y, and the color difference signals R-Y, B-Y are turned by ±10°, while the color saturation level S thereof is increased by 0.5 times and 1.5 times. The luminance signal Y, the color difference signals R-Y, B-Y, and the signals obtained from the above color hue control and the color saturation control are shown in Table 4-1. Also Table 4-2 converts the signals in 4-1 in the RGB signals to express in 256 gradation. Further, in FIG. 6 the signals in Table 4-1 are plotted on a plane coordinates of B-Y, R-Y. It is confirmed in the tables as well as the figure that control of the color hue level and the color saturation level can be applied without deviating the white balance correction.

The white balance coefficient can be automatically determined and set by a fuzzy inference and the like in accordance with the input image information, although it is

TABLE 4-1

| input signals | | | corrected signals ○ | | | θ = 10° Δ | | | θ = −10° ▲ | | | S = 1.5 □ | | | S = 0.5 ■ | | |
|---|---|---|---|---|---|---|---|---|---|---|---|---|---|---|---|---|---|
| R | G | B | Y | R-Y | B-Y | Y | R-Y | B-Y | Y | R-Y | B-Y | Y | R-Y | B-Y | Y | R-Y | B-Y |
| 0.6 | 0 | 0 | 0.18 | 0.40 | −0.17 | 0.18 | 0.36 | −0.25 | 0.18 | 0.42 | −0.11 | 0.18 | 0.60 | −0.27 | 0.18 | 0.20 | −0.09 |
| 0 | 0.6 | 0 | 0.35 | −0.35 | −0.35 | 0.35 | −0.41 | −0.29 | 0.35 | −0.29 | −0.41 | 0.35 | −0.53 | −0.53 | 0.35 | −0.18 | −0.18 |
| 0 | 0 | 0.6 | 0.07 | −0.08 | 0.61 | 0.07 | 0.03 | 0.62 | 0.07 | −0.18 | 0.60 | 0.07 | −0.11 | 0.93 | 0.07 | −0.04 | 0.31 |

TABLE 4-2

| input signals | | | corrected signals ○ | | | θ = 10° Δ | | | θ = −10° ▲ | | | S = 1.5 □ | | | S = 0.5 □ | | |
|---|---|---|---|---|---|---|---|---|---|---|---|---|---|---|---|---|---|
| R | G | B | R | G | B | R | G | B | RE | G | B | RE | G | B | R | G | B |
| 153 | 0 | 0 | 148 | 3 | 0 | 138 | 11 | 0 | 154 | 0 | 18 | 199 | 0 | 0 | 96 | 24 | 22 |
| 0 | 153 | 0 | 0 | 153 | 0 | 0 | 157 | 17 | 17 | 147 | 0 | 0 | 184 | 0 | 45 | 122 | 45 |
| 0 | 0 | 153 | 0 | 0 | 174 | 25 | 0 | 175 | 0 | 12 | 169 | 0 | 0 | 253 | 7 | 7 | 96 | determined by user of the printer in the above.

The white balance correction coefficient determination means, the color control coefficient determination means, and the first and the second coefficient operation means, all of which are driven by the MPU 101 in the above, may operate independently.

In the third embodiment, the color hue correction and the color saturation correction are applied to the corrected color difference signals obtained in the first embodiment; however, such corrections may be applied to the corrected color difference signals obtained in the second embodiment. If the white balance correction in the second embodiment instead of the first embodiment is employed in the third embodiment, the circuit will become simplified.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An image processing device for applying a color adjustment including a white balance correction to a luminance signal and two color difference signals of an input color image, the image processing device comprising:

means for providing at least two white balance coefficient signals;

correction coefficient generation means for generating a two-row one-column matrix and a two-row two-column matrix from the at least two white balance coefficient signals, the two-row one-column matrix being comprised of two correction coefficient signals to be applied to the luminance signal and the two-row two-column matrix being comprised of four correction coefficient signals to be applied to the two color difference signals;

a first multiplier for multiplying the luminance signal by the two correction coefficient signals to generate a multiplication result signal of the first multiplier;

a second multiplier for multiplying the two color difference signals by the four correction coefficient signals to generate a multiplication result signal of the second multiplier;

an adder for generating two corrected color difference signals corresponding to the two-color difference signals by adding the multiplication result of the first multiplier and the multiplication result of the second multiplier.

2. The image processing device of claim 1, wherein the two-row one-column matrix generated by the correction coefficient generation means is:

$$\begin{bmatrix} Kr-1 \\ Kb-1 \end{bmatrix}, \text{and}$$

the two row two-column matrix generated by the correction coefficient generation means is:

$$\begin{bmatrix} 0.3 + 0.7Kr & 0.11 - 0.11Kb \\ 0.3 - 0.3Kr & 0.11 + 0.89Kb \end{bmatrix},$$

in which Kr and Kb indicate amplitude of an R signal and amplitude of a B signal respectively.

3. The image processing device of claim 1, wherein the two-row one-column matrix generated by the correction coefficient generation means is:

$$\begin{bmatrix} Kr-1 \\ Kb-1 \end{bmatrix}, \text{and}$$

the two-row two-column matrix generated by the correction coefficient generation means is a unit matrix, in which Kr and Kb indicate amplitude of an R signal and amplitude of a B signal respectively.

4. The image processing device of claim 1, wherein the two-row one-column matrix generated by the correction coefficient generation means is:

$$\begin{bmatrix} -S\cos\theta \cdot (Kr-1) + S\sin\theta \cdot (Kb-1) \\ -S\sin\theta \cdot (Kr-1) + S\cos\theta \cdot (Kb-1) \end{bmatrix}, \text{and}$$

the two-row two-column matrix is:

$$\begin{bmatrix} S\cos\theta \cdot (0.3 + 0.7Kr) & S\cos\theta \cdot (0.11 - 0.11Kb) \\ +S\sin\theta \cdot (0.3 - 0.3Kr) & +S\sin\theta \cdot (0.11 + 0.89Kb) \\ -S\sin\theta \cdot (0.3 + 0.7Kr) & -S\sin\theta \cdot (0.11 - 0.11Kb) \\ +S\cos\theta \cdot (0.3 - 0.3Kr) & +S\cos\theta \cdot (0.11 + 0.89Kb) \end{bmatrix},$$

Kr and Kb being amplitude of an R signal and amplitude of a B signal respectively, S being a color saturation correction value and $\theta$ being a color hue correction value.

5. An image processing device correcting white balance of two color difference signals comprising:

white balance coefficient setting means for setting a white balance coefficient for an image signal;

white balance correction coefficient determination means for determining two white balance correction coefficients to be applied to a luminance signal included in the image signal in accordance with the white balance coefficient set at the white balance coefficient setting means;

luminance signal operation means for multiplying the luminance signal by each of said two white balance correction coefficients so that two output signals resulting from the multiplication will be obtained;

a first adder for adding one of said two output signals obtained by the luminance signal operation means and a first color difference signal of said two color difference signals included in the image signal together to generate an adding result of the first adder;

a second adder for adding the other of said two output signals obtained by the luminance signal operation means and a second color difference signal of said two color difference signals included in the image signal together to generate an adding result of the second adder;

first output means for outputting the adding result of the first adder as a white balance coefficient for the first color difference signal; and second output means for outputting the adding result of the second adder as a white balance coefficient for the second color difference signal.

6. An image processing device correcting white balance of two color difference signals comprising:

white balance coefficient setting means for setting a white balance coefficient for an image signal;

white balance correction coefficient determination means for determining six white balance correction coefficients in accordance with the white balance coefficient set at the white balance coefficient setting means, two of the white balance correction coefficients embodying a first white balance correction coefficient group to be applied to a luminance signal and the other four of the white balance correction coefficients embodying a second white balance correction coefficient group to be applied to said two color difference signals;

luminance signal operation means for multiplying the luminance signal by each of said two white balance correction coefficients included in the first white balance correction coefficient group so that two output signals being results of the multiplication will be obtained; and matrix operation means for operating two-row two-column matrix made up of said two color difference signals and said four white balance correction coefficients included in the second white balance correction coefficient group so that two output signals being operation results of the two-row two-column matrix will be obtained;

a first adder for adding one of the output signals from the luminance signal operation means and one of the output signals from the matrix operation means together to generate an adding result of the first adder;

a second adder for adding the other of the output signals from the luminance signal operation means and the other of the output signals from the matrix operation means together to generate an adding result of the second adder;

first output means for outputting the adding result of the first adder as a white balance coefficient for one of said two color difference signals; and second output means for outputting the adding result of the second adder as a white balance coefficient for the other of said two color difference signal.

7. An image processing device for applying white balance correction, color hue correction, and color saturation correction to two color difference signal, the image processing device comprising:

white balance coefficient setting means for setting a white balance coefficient for an image signal;

white balance correction coefficient determination means for determining six white balance correction coefficients in accordance with the white balance coefficient set at the white balance coefficient setting means, two of the white balance correction coefficients embodying a first white balance correction coefficient group to be applied to a luminance signal and the other four of the white balance correction coefficients embodying a second white balance correction coefficient group to be applied to said two color difference signals;

color hue correction value setting means for setting a color hue correction value which corrects color hue degree of the image signal;

color saturation correction value setting means for setting a color saturation correction value which corrects color saturation degree of the image signal;

color correction coefficient determination means for determining a color correction coefficient group to be applied to said two color difference signals in accordance with the color hue correction value set by the color hue correction value setting means and with the color saturation correction value set by color saturation correction value setting means, the color correction coefficient group comprising four color correction coefficients;

first coefficient operation means for determining a first color difference coefficient group to be applied to the luminance signal in accordance with the first white balance correction coefficient group determined by the white balance correction coefficient determination means as well as with the color correction coefficient group determined by the color correction coefficient determination means, the first color difference coefficient group comprising two color difference correction coefficients;

second coefficient operation means for determining a second color difference coefficient group to be applied to said two color difference signals in accordance with the second white balance correction coefficient group determined by the white balance correction coefficient determination means as well as with the color correction coefficient group determined by the color correction coefficient determination means;

luminance signal operation means for multiplying the luminance signal by each of said two color difference correction coefficients included in the first color difference coefficient group so that two outputs will be made of results of the multiplication;

matrix operation means for operating two-row two-column matrix made up of said two color difference signals and said four white balance correction coefficients included in the second white balance correction coefficient group so that two output signals being operation results of the two-row two-column matrix will be obtained;

a first adder for adding one of the output signals from the luminance signal operation means and one of the output signals from the matrix operation means together to generate an adding result of the first adder;

a second adder for adding the other of the output signals from the luminance signal operation means and the other of the output signals from the matrix operation means together to generate an adding result of the second adder;

first output means for outputting the adding result of the first adder as a white balance coefficient for one of said two color difference signals; and second output means for outputting the adding result of the second adder as a white balance coefficient for the other of said two color difference signal.

8. In an image processing device for applying a color adjustment including a white balance correction to, respectively, a luminance signal and two color difference signals of an input color image, the improvement comprising:

means for providing two white balance coefficient signals;

a white balance correction coefficient circuit for generating a first group of correction signals and a second group of correction signals from the two white balance coefficient signals; and means for modifying the luminance signal based upon the first group of correction signals to generate a corrected luminance signal and for modifying the two color difference signals based upon the second group of correction signals to generate two corrected color difference signals, wherein the two white balance coefficient signals comprise a Kr signal and a Kb signal indicating respective amplitudes of an R signal and a B signal, and wherein the white balance correction coefficient circuit includes a two-row one-column matrix for generating the first group of signals and a two-row two-column matrix for generating the second group of signals.

9. The image processing device of claim 8, wherein the two-row one-column matrix is:

$$\begin{bmatrix} Kr-1 \\ Kb-1 \end{bmatrix}, \text{and}$$

and wherein the two-row two-column matrix is:

$$\begin{bmatrix} 0.3+0.7Kr & 0.11-0.11Kb \\ 0.3-0.3Kr & 0.11+0.89Kb \end{bmatrix}.$$

10. The image processing device of claim 8, wherein the two-row one-column matrix is:

$$\begin{bmatrix} Kr-1 \\ Kb-1 \end{bmatrix}, \text{and}$$

and wherein the two-row two-column matrix is a unit matrix.

11. The image processing device of claim 8, wherein the two-row one-column matrix is:

$$\begin{bmatrix} -S\cos\theta \cdot (Kr-1) + S\sin\theta \cdot (Kb-1) \\ -S\sin\theta \cdot (Kr-1) + S\cos\theta \cdot (Kb-1) \end{bmatrix}, \text{and}$$

and wherein the two-row two-column matrix is:

$$\begin{bmatrix} S\cos\theta \cdot (0.3+0.7Kr) & S\cos\theta \cdot (0.11-0.11Kb) \\ +S\sin\theta \cdot (0.3-0.3Kr) & +S\sin\theta \cdot (0.11+0.89Kb) \\ \\ -S\sin\theta \cdot (0{,}3+0.7Kr) & -S\sin\theta \cdot (0.11-0.11Kb) \\ +S\cos\theta \cdot (0.3-0.3Kr) & +S\cos\theta \cdot (0.11+0.89Kb) \end{bmatrix},$$

S being a color saturation correction value and $\theta$ being a color hue correction value.

* * * * *